US012119147B2

(12) United States Patent
Lo

(10) Patent No.: US 12,119,147 B2
(45) Date of Patent: Oct. 15, 2024

(54) RESISTOR DEVICE

(71) Applicant: JUNEWAY ELECTRONIC TECHNOLOGY CO., LTD, Jiangmen (CN)

(72) Inventor: Ta-Wen Lo, Jiangmen (CN)

(73) Assignee: JIANGMEN JUNEWAY ELECTRONIC TECHNOLOGY CO., LTD, Guangdong (CN)

( * ) Notice: Subject to any disclaimer, the term of this patent is extended or adjusted under 35 U.S.C. 154(b) by 185 days.

(21) Appl. No.: 17/588,839

(22) Filed: Jan. 31, 2022

(65) Prior Publication Data

US 2022/0319744 A1 Oct. 6, 2022

(30) Foreign Application Priority Data

Apr. 1, 2021 (CN) ........................ 202110356002.4

(51) Int. Cl.
*H01C 1/14* (2006.01)

(52) U.S. Cl.
CPC .................................... *H01C 1/14* (2013.01)

(58) Field of Classification Search
CPC ....................................................... H01C 1/14
See application file for complete search history.

(56) References Cited

U.S. PATENT DOCUMENTS 3,691,502 A * 9/1972 Kataoka ................ H01C 10/00 330/6
5,015,989 A * 5/1991 Wohlfarth .............. H01C 17/24 338/195
5,198,794 A * 3/1993 Sato ....................... H01C 17/24 338/195
8,183,976 B2 * 5/2012 Lo .......................... H01C 1/148 338/320
8,779,887 B2 * 7/2014 Lo ........................... H01C 7/13 338/320
9,305,687 B2 * 4/2016 Cheng ................... G01R 1/203
2012/0200383 A1 * 8/2012 Lo ......................... H01C 7/003 338/314
2014/0266568 A1 * 9/2014 Cheng ................... G01R 1/203 338/314

* cited by examiner

*Primary Examiner* — Kyung S Lee
(74) *Attorney, Agent, or Firm* — MUNCY, GEISSLER, OLDS & LOWE, P.C.

(57) ABSTRACT

A resistor device has a resistor body, a first electrode assembly and a second electrode assembly. The resistor body has a resistor layer. The first electrode assembly has two first electrodes symmetrically distributed on both sides of the resistor layer, wherein the first electrodes are electrically connected to the resistor layer. The second electrode assembly has two second electrodes symmetrically distributed on both sides of the resistor layer, wherein the second electrodes are electrically connected to the resistor layer, and positions which the first electrode and the second electrode located on the same side of the resistor layer are connected to the resistor layer have an equipotential. The resistor device does not generate voltage drop through voltammetry detection, improves the accuracy of resistance value precision measurement of the voltammetry detection, and thus can be applied to precision circuits that have high requirements on resistance value precision.

20 Claims, 11 Drawing Sheets

RESISTOR DEVICE

BACKGROUND

Technical Field

The present disclosure relates to a resistor device, and especially a resistor device with four electrodes, which changes the internal circuit structure through the characteristics of the four electrodes, so that the measurement of current and voltage terminals is not disturbed, and it can effectively stabilize the on board resistance of the single unit and the stability after it has been set on the board.

Related Art

At present, the resistance value measurement of resistor device to be tested is often detected by voltammetry, that is, voltmeter and resistor device to be tested are connected in parallel, and ammeter and resistor device to be tested are connected in series. However, the current resistor device usually has merely two electrodes. When performing the voltage detection and the current detection, these two electrodes are used as detection points for detection, and the measurement results will be affected by the voltage drop, especially for the measurement of the resistor device to be tested with the high-precision resistance value, the measurement result is that the measured value of the resistance precision of the resistor device to be tested is inaccurate.

The current trend is that the detection instrument needs to be more and more precise, so the requirements of the resistance for current detection is also higher and higher, from the past 5% error tolerance in precision demand to the high precision demand more and more. The current requirement of the precision demand is 0.1% error tolerance. In the past, the so-called measurement accuracy was only limited to the measurement on the single unit, and the actual application of the circuit board did not meet the accuracy requirements, so that the component measurement and the actual resistance value measured after the resistor is set on board has a certain drop in the measurement precision, and it does not meet the actual 0.1% error tolerance of the actual accuracy requirement.

Further, the conventional resistor device has only two electrodes, the used measurement method is to make the current and voltage collinear, and the measurement result will be affected by the wire voltage drop, resulting in loss of accuracy. In order to improve the measurement accuracy, a four-wire measurement method has been proposed for the resistor device with merely two electrodes. This method separates the voltage and current, but it is still measured on the same electrode, so it will still be interfered in essence. The measured resistance value will include the electrode copper part, so the resistor device includes the electrode copper resistance value and is affected by temperature drift and affects the accuracy.

Although the resistor device of four electrodes has been provided by some people in the industry at present, but this resistor device adopts the upper and lower conduction manner. Although the current point and the voltage point are separated, because the probe position of the voltage electrode will still collect part of the electrode, the resistance value of copper, the measured resistance value is affected. Therefore, there is still an urgent need in the industry for a resistor device that can effectively stabilize the on board resistance of a single device and for the stability after the resistor device is mounted on the board.

SUMMARY

An objective of the present disclosure is to provide a resistor device, aiming to solve the technical problem that the resistance value accuracy is not accurate enough due to the influence of the voltage drop when the resistor device with the merely two electrodes is detected by voltammetry. In the present disclosure, the proposed resistor device comprises a resistor body, a first electrode assembly and a second electrode assembly. The resistor body comprises a resistor layer. The first electrode assembly comprises two first electrodes symmetrically distributed on both sides of the resistor layer, wherein two first electrodes are electrically connected to the resistor layer. The second electrode assembly comprises two second electrodes symmetrically distributed on both sides of the resistor layer, wherein the second electrodes are electrically connected to the resistor layer, and positions which the first electrode and the second electrode located on the same side of the resistor layer are connected to the resistor layer have an equipotential.

According to the structural design of above-mentioned resistor device, when adopting voltammetry to detect the resistor device of the present disclosure, the voltmeter is connected in parallel with two first electrodes of the resistor device, and the ammeter is connected in series with the two second electrodes of the resistor device. Since positions which the first electrode and the second electrode located on the same side of the resistor layer are connected to the resistor layer have an equipotential, there is no voltage drop between the first electrode and the second electrode, and the voltage measured by the voltmeter will not be disturbed. The resistance value of the resistor device calculated by the current measured by the ammeter and the voltage measured by the voltmeter is highly accurate. The resistor device of the present disclosure does not generate a voltage drop through voltammetry detection, and improves the accuracy of the resistance value precision measurement of voltammetry detection.

In short, the resistor device with four electrodes of the present disclosure changes the internal circuit structure through the characteristics of the four electrodes, so that the measurement of current and voltage terminals is not disturbed, and it can effectively stabilize the on board resistance of the single unit and the stability after it has been set on the board.

BRIEF DESCRIPTIONS OF DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings. All of the drawings of the present disclosure are listed and briefly described as follows.

DETAILS OF EXEMPLARY EMBODIMENT

The present disclosure provides a resistor device, wherein two first electrodes for a voltmeter are symmetrically arranged on opposite sides of the resistor layer of the resistor body, and two second electrodes for connecting an ammeter are symmetrically arranged on opposite sides of the resistor layer of the resistor body. Each first electrode is electrically connected to the resistor layer through the first wire, and each second electrode can be electrically connected to the resistor layer directly or through the second wire, and positions which the first electrode and the second electrode located on the same side of the resistor layer are connected to the resistor layer have an equipotential. Therefore, the technical problem that the resistance value accuracy is not accurate enough due to the influence of the voltage drop when the conventional two-electrode resistor device is detected by voltammetry can be solved.

Figure 1:
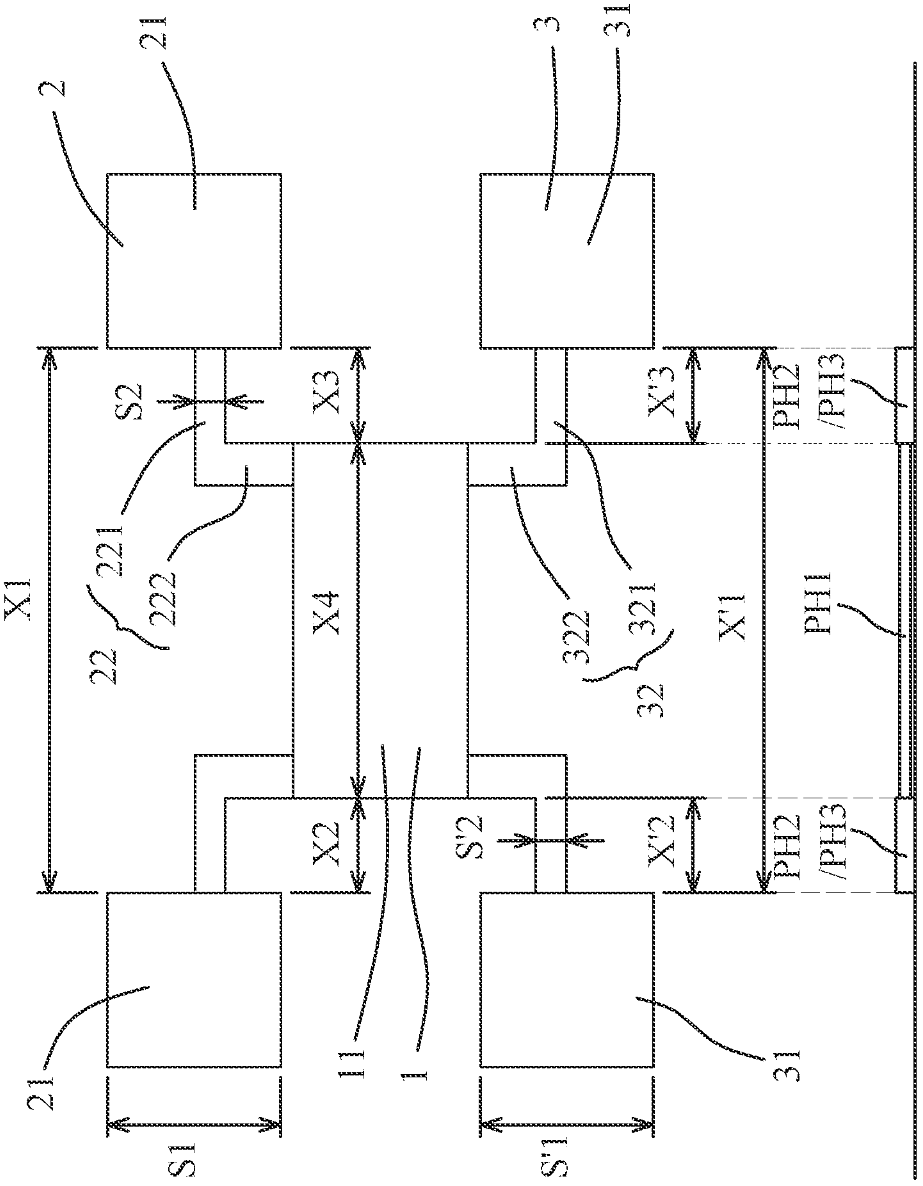
FIG. 1 is a schematic diagram showing a structure of a resistor device according to an embodiment of the present disclosure.

Refer to FIG. 1, and FIG. 1 is a schematic diagram showing a structure of a resistor device according to an embodiment of the present disclosure. In FIG. 1, the resistor device comprises a resistor body 1, a first electrode assembly 2 and a second electrode assembly 3. The resistor body 1 comprises a resistor layer 11. The first electrode assembly 2 comprises two first electrodes 21 symmetrically distributed on both sides of the resistor layer 11 (such as, the left and right sides of the resistor layer 11). The second electrode assembly 3 comprises two second electrodes 31 symmetrically distributed on both sides of the resistor layer 11 (such as, the left and right sides of the resistor layer 11). The first electrodes 21 are electrically connected to the second electrode 31 and resistor layer 11. The first electrode 21 and the second electrode 31 of the resistor device can be designed well, thus positions which the first electrode 21 and the second electrode 31 located on the left side of the resistor layer 11 are connected to the resistor layer 11 have an equipotential, and positions which the first electrode 21 and the second electrode 31 located on the right side of the resistor layer 11 are connected to the resistor layer 11 have an equipotential.

When using voltammetry to detect the resistor device of the present disclosure, the voltmeter is connected in parallel with the two first electrodes 21 of the resistor device, and the ammeter is connected in series with the two second electrodes 31 of the resistor device. Because the positions which the first electrode 21 and the second electrode 31 located on the same side of the resistor layer 11 are connected to the resistor layer 11 have an equipotential, there is no voltage drop between first electrode 21 and second electrode 31, and the voltage measured by the voltmeter will not be disturbed. Therefore, the resistance value of the resistor device calculated by the voltage measured by the voltmeter and the current measured by the ammeter is highly accurate. The resistor device of the disclosure does not generate a voltage drop through voltammetry detection, and improves the accuracy of the resistance value precision measurement of voltammetry detection.

In the embodiment of FIG. 1, the lengths and the widths of the first electrode 21 and the second electrode 31 located on the same side of the resistor layer 11 are the same, and the first electrode 21 and the second electrode 31 are symmetrically distributed on the other two sides of the resistor layer 11 (for example, the upper and lower sides of the resistor layer 11). That is, the dimensions and the areas of the first electrode 21 and the second electrode 31 are the same. In the embodiment, the first electrode assembly 2 further comprises two first wires 22. An end of each first wire 22 is connected to the corresponding one first electrode 21, another end of each first wire 22 is connected to the resistor layer 11. The second electrode assembly 3 further comprises two second wires 32, an end of each second wire 32 is connected to the corresponding one second electrode 31, another end of each second wire 32 is connected to the resistor layer 11, and positions which the first wire 22 and the second wire 32 located on the right side of the resistor layer 11 are connected to the resistor layer 11 have an equipotential.

In the embodiment, to connect the probe of the voltmeter and the probe of the ammeter to the non-interference area of the first electrode 21 and the second electrode 31, the design will minimize the interference area of the first electrode 21 and the second electrode 31 to reduce the interaction between the first electrode 21 and the resistor layer 11 and reduce the interaction between the second electrode 31 and the resistor layer 11. Thus, after the resistor device is powered on, the positions which the first wire 22 and the second wire 32 located on the same side of the resistor layer 11 are connected to the resistor layer 11 have the equipotential.

In order to achieve the above-mentioned purpose, in this embodiment, the width S2 of the first wire 22 is designed to be smaller than the width S1 of the connection terminal of the first electrode 21, and the width S'2 of the second wire 32 is designed to be smaller than the width S1' of the connection terminal of the second electrode 31 (p.s. in this embodiment, each of the length and width of the second wire 32 and the first wire 21 on the same side is the same as each other, and the second wire 32 and the first wire 21 are symmetrically distributed on the other two sides of the resistor layer 11, but the present disclosure is not limited by this). With the above design, the resistor device of the present disclosure can use the design of the above four electrodes (the two first electrodes 21 and the two second electrodes 31) to change the internal circuit structure so that the measurement of current and voltage terminals is not disturbed, which can effectively stabilize the on board resistance of the single unit and improve the stability after the resistor device is set on the board.

Further, each first wire 22 includes a first straight wire 221 and a second straight wire 222 that are vertically connected to each other, one end of the first straight wire 221 away from the second straight wire 222 is connected to the first electrode 21, and one end of the second straight wire 222 away from the first straight wire 221 is connected to the resistor layer 11. Positions which the second wire 32 and the second straight wire 222 located on the same side of the resistor layer 11 are connected to the resistor layer 11 have an equipotential.

In addition, if the projection line PH1 of the resistor layer 11 in the horizontal direction (the direction from the left to the right) overlaps the projection line PH2 of any one of the two first straight wires 221 in the horizontal direction, there is an interference area which affects the resistance measurement, and the interference area will reduce the resistance measurement accuracy. To avoid this, the design should make a distance X4 between two opposite sides of the resistor layer 11 (the left and right sides of the resistor layer 11), a distance X2 between two ends of one of the two first straight wires 221, a distance X3 between two ends of the other one of the two first straight wires 221 and a distance X1 between the two first electrodes 21 meet an equation as follows, X4≤(X1−X2−X3). That is, the summation of the distance X4 between two opposite sides of the resistor layer 11, the distance X2 between two ends of one of the two first straight wires 221 and the distance X3 between two ends of the other one of the two first straight wires 221 is less than or equal to the distance X1 between the two first electrodes 21. Thus, the projection line PH1 of the resistor layer 11 in the horizontal direction will not overlap the projection lines PH2 of the two first straight wires 221 in the horizontal direction.

Similarly, the second wire 32 includes a third straight wire 321 and a fourth straight wire 322 that are vertically connected to each other, an end the third straight wire 321 away from the fourth straight wire 322 is connected to the second electrode 31, and an end away from the fourth straight wire 322 is connected to the resistor layer 11. Positions which the second straight wire 222 and the fourth straight wire 322 located on the right side of the resistor layer 11 are connected to the resistor layer 11 have an equipotential. Each of the width and length of the third straight wire 321 and the first straight wires 221 are the same as each other, and the present disclosure is not limited thereto.

In addition, if the projection line PH1 of the resistor layer 11 in the horizontal direction (the direction from the left to the right) overlaps the projection line PH3 of any one of the two third straight wire 321 in the horizontal direction, there is an interference area which affects the resistance measurement, and the interference area will reduce the resistance measurement accuracy. To avoid this, the design should make a distance X4 between two opposite sides of the resistor layer 11 (the left and right sides of the resistor layer 11), a distance X'2 between two ends of one of the two third straight wires 321, a distance X'3 between two ends of the other one of the two third straight wires 321 and a distance X'1 between the two second electrodes 31 meet an equation as follows, X4≤(X'1−X'2−X'3). That is, the summation of the distance X4 between two opposite sides of the resistor layer 11, the distance X'2 between two ends of one of the two third straight wires 321 and the distance X'3 between two ends of the other one of the two third straight wires 321 is less than or equal to the distance X'1 between the two second electrodes 31. Thus, the projection line PH1 of the resistor layer 11 in the horizontal direction will not overlap the projection lines PH3 of the two third straight wires 321 in the horizontal direction.

Figure 2:
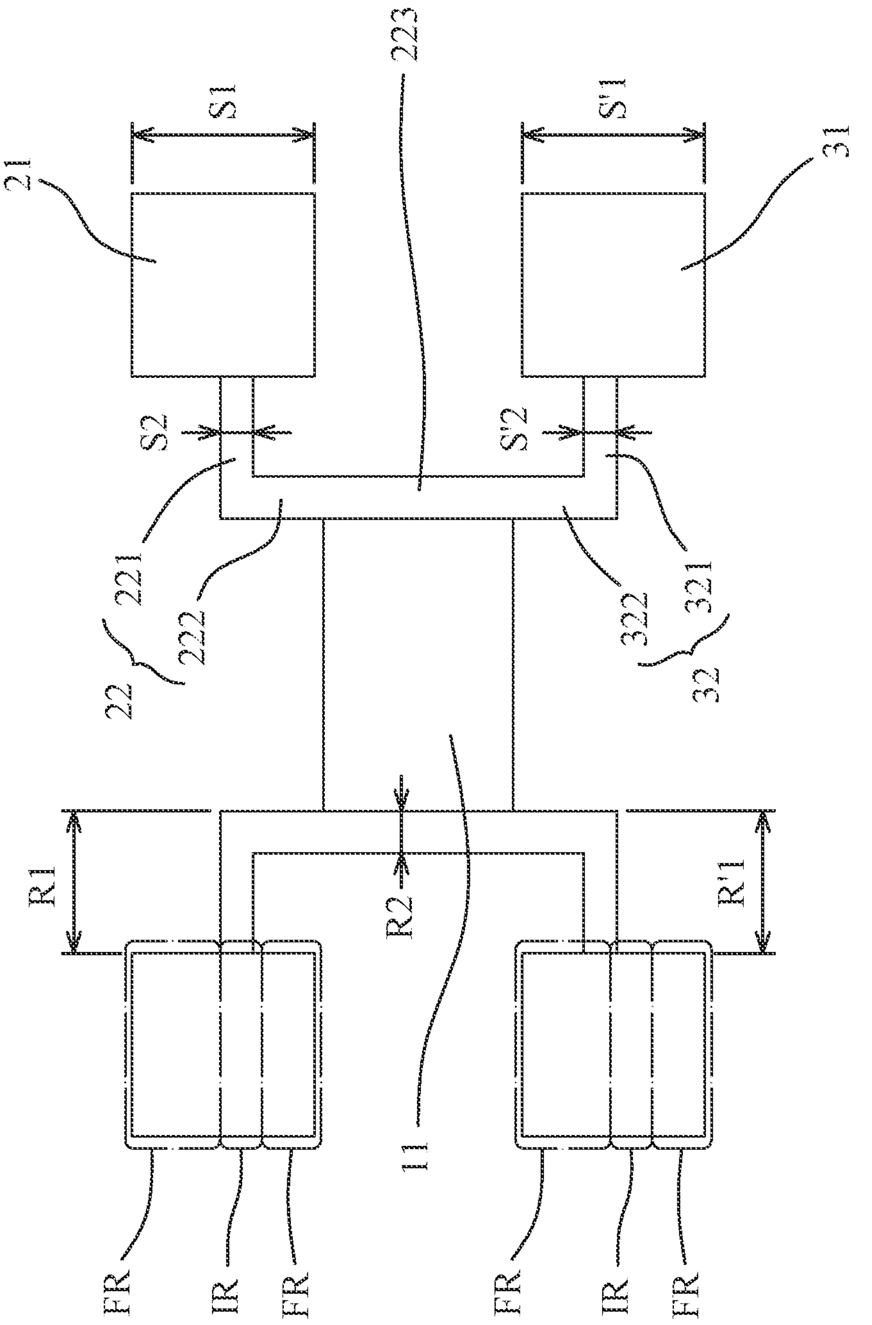
FIG. 2 is a schematic diagram showing a structure of a resistor device according to another embodiment of the present disclosure.

Refer to FIG. 2, and FIG. 2 is a schematic diagram showing a structure of a resistor device according to another embodiment of the present disclosure. Being different from the embodiment of FIG. 1, in the embodiment, the resistor device further comprises two fifth straight wires 223, wherein the second straight wire 222 and the fourth straight wire 322 on the same side of the resistor layer 11 are collinear and connected to the corresponding one fifth straight wire 223, and a side of the fifth straight wire 223 is connected to the resistor layer 11. When the conduction length of the resistor device is small, the second straight wire 222 and the fourth straight wire 322 can be collinear, and connected to each other via the fifth straight wire 223, and the side of the fifth straight wire 223 can be connected to the connection terminal of the resistor layer 11.

In the embodiment, the width S2 of the first wire 22 is less than the width S1 of the connection terminal of the first electrode 21, the width S'2 of the second wire 32 is less than the width S1' of the connection terminal of the second electrode 31. Thus, the first electrode 21 and the second electrode 22 can have a non-interference area FR outside the interference area IR, and the probes of the ammeter and the voltmeter can be arranged in the non-interference area FR, wherein the measurement accuracy at different position in the non-interference area FR will not be affected, so that the repeatability of the measurement system tends to be consistent.

In addition, when the relationship between the first electrode 21 and the second electrode 31 is relationship of a current and a voltage, and the width R2 of the fifth straight wire 223 is greater than the distance R1 between the first electrode 21 and the resistor layer 11 in the horizontal direction, the first electrode 21 used for voltage end detection will have an extra interference area, and this interference area will change the current and voltage paths, and may affect the space of the non-interference area, resulting in the impact of resistance stability. Therefore, in the design, the width R2 of the fifth straight wire 223 is less than or equal to the distance R1 between the first electrode 21 and the resistor layer 11 in the horizontal direction, that is, R2≤R1. Similarly, in order to avoid similar problems when the first electrode 21 and the second electrode 31 are interchanged (i.e. the first electrode 21 and the second electrode 31 are respectively connected to an ammeter and a voltmeter), the design will make the width R2 of the fifth straight wire 223 less than or equal to the distance R'1 between the second electrode 31 and the resistor layer 11 in the horizontal direction.

Figure 3:
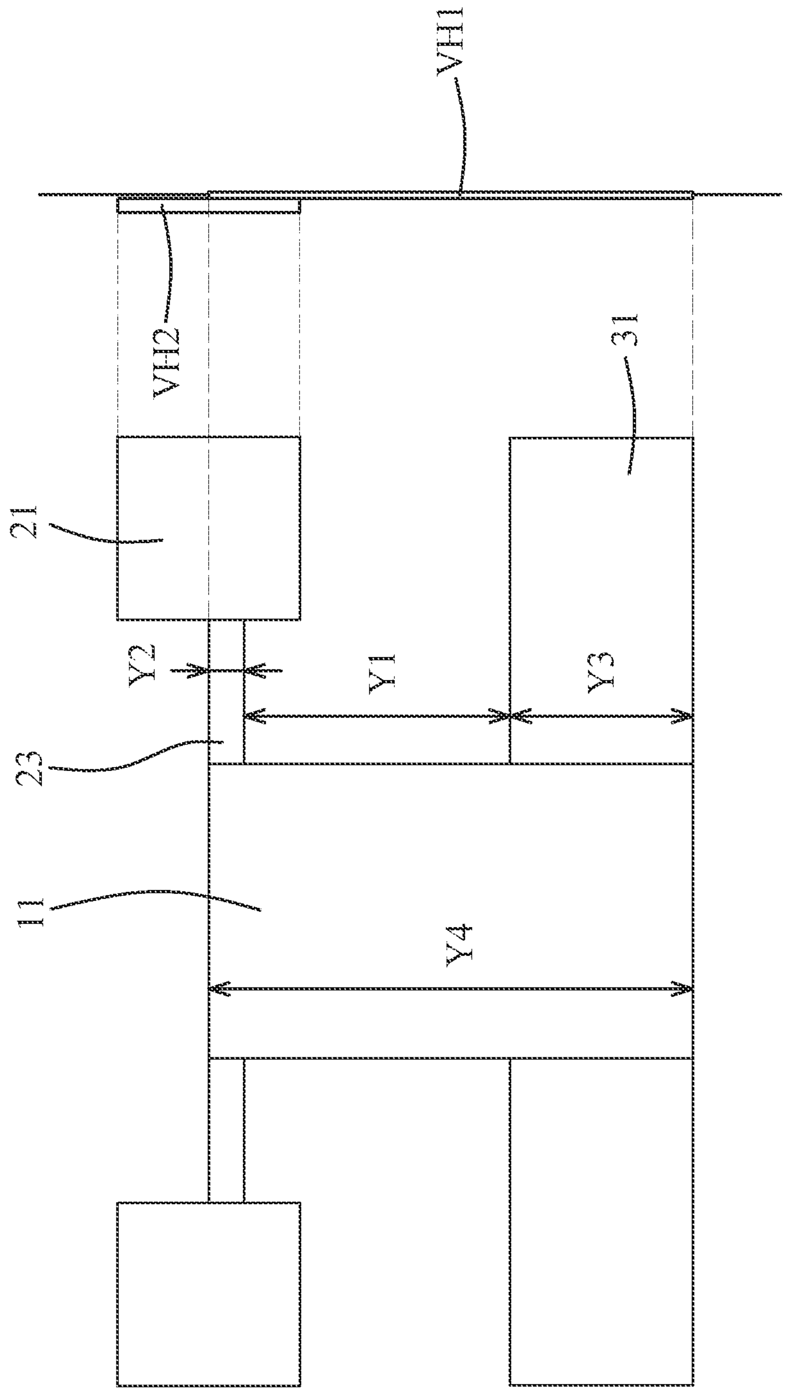
FIG. 3 is a schematic diagram showing a structure of a resistor device according to another embodiment of the present disclosure.

Refer to FIG. 3, and FIG. 3 is a schematic diagram showing a structure of a resistor device according to another embodiment of the present disclosure. Being different from the embodiment of FIG. 1, the first electrode 21 in FIG. 3 is electrically connected to the resistor layer 11 only through the wire 23 in the horizontal direction, and the second electrode 31 is directly electrically connected to the resistor layer 11 without any wire. One end of each wire 23 is connected to the first electrode 21, and the other end of each wire 23 is connected to the resistor layer 11. After the resistor device is powered on, positions which the wire 23 and the second electrode 31 located on the right side of the resistor layer 11 are connected to the resistor layer 11 have an equipotential.

As mentioned above, to reduce the interference and to stabilize the measured resistance value, the width Y2 of the wire 23, the width Y3 of the second electrode 31, the distance Y1 between the wire 23 and the second electrode 31 and the length Y4 of the resistor layer 11 in the vertical direction meet the equation as follows, $Y4 \leq (Y1+Y2+Y3)$. That is, the summation of the width Y2 of the wire 23, the width Y3 of the second electrode 31 and the distance Y1 between the wire 23 and the second electrode 31 is larger than or equal to the length Y4 of the resistor layer 11 in the vertical direction. Thus, the projection line VH1 of the resistor layer 11 in the vertical direction will not entirely overlap the projection lines VH2 of the first electrodes 21 in the vertical direction, but just partially overlaps the projection lines VH2 of the first electrodes 21, and the first electrode 21 still has a part of the non-interference area that can be contacted by the measuring probe.

Figure 4:
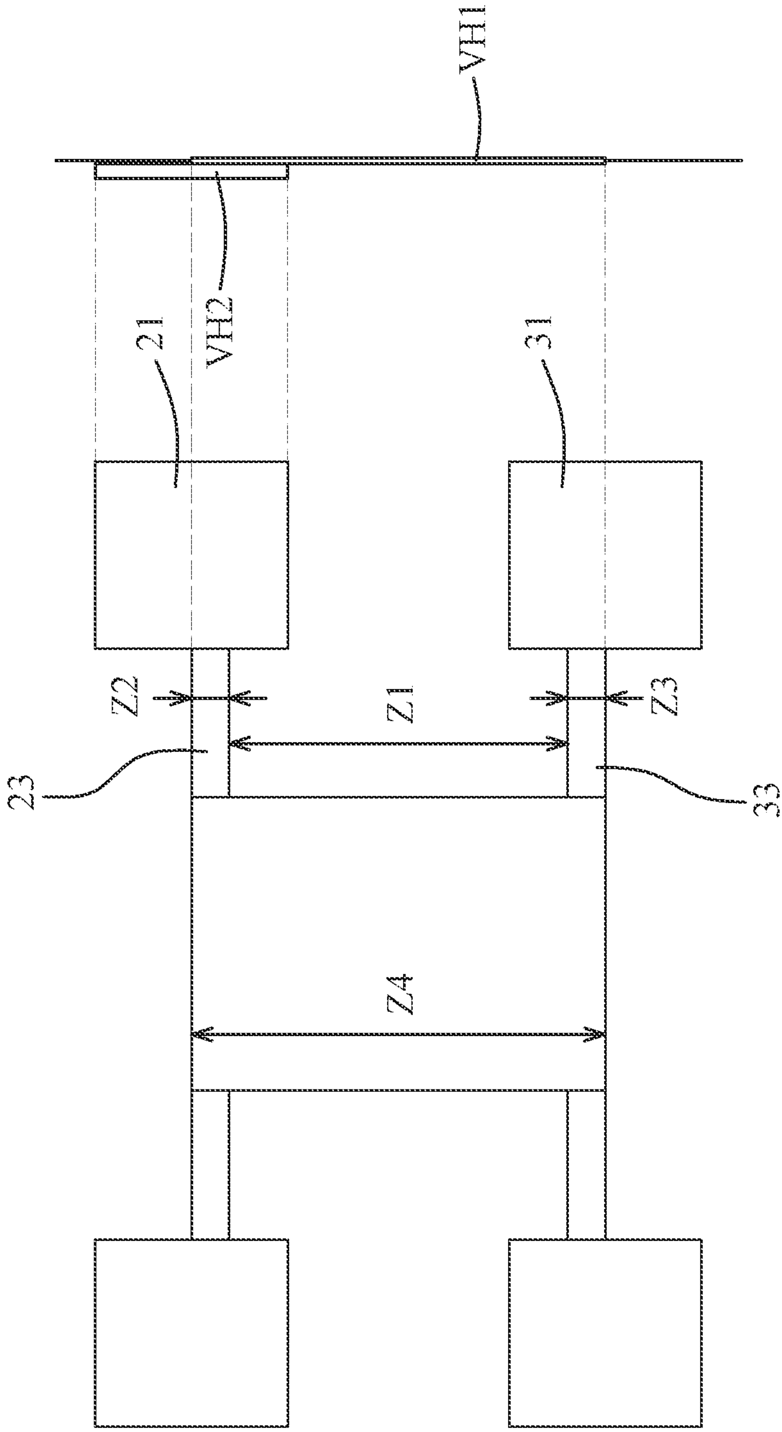
FIG. 4 is a schematic diagram showing a structure of a resistor device according to another embodiment of the present disclosure.

Refer to FIG. 4, and FIG. 4 is a schematic diagram showing a structure of a resistor device according to another embodiment of the present disclosure. Being different from the embodiment of FIG. 1, the first electrode 21 and the second electrode 31 in FIG. 4 electrically connected to the resistor layer 11 via the wires 23, 33 in the horizontal direction. One end of each wire 23 is connected to a first electrode 21, and the other end of each wire 23 is connected to the resistor layer 11. One end of each wire 33 is connected to a second electrode 31, and the other end of each wire 33 is connected to the resistor layer 11. After the resistor device is powered on, the positions which the wires 23, 33 located on the same side of the resistor layer 11 are connected to the resistor layer 11 have the equipotential.

As mentioned above, to reduce the interference and to stabilize the measured resistance value, the width Z2 of the wire 23, the width Z3 of the wire 33, the distance Z1 between the wire 23 and the wire 33 and the length Z4 of the resistor layer 11 in the vertical direction meet the equation as follows, $Z4 \leq (Z1+Z2+Z3)$. That is, the summation of the width Z2 of the wire 23, the width Z3 of the wire 33 and the distance Z1 between the wire 23 and the wire 33 is larger than or equal to the length Z4 of the resistor layer 11 in the vertical direction. Thus, the projection line VH1 of the resistor layer 11 in the vertical direction will not entirely overlap the projection lines VH2 of the first electrodes 21 in the vertical direction, but just partially overlaps the projection lines VH2 of the first electrodes 21, and the first electrode 21 still has a part of the non-interference area that can be contacted by the measuring probe.

Figure 5:
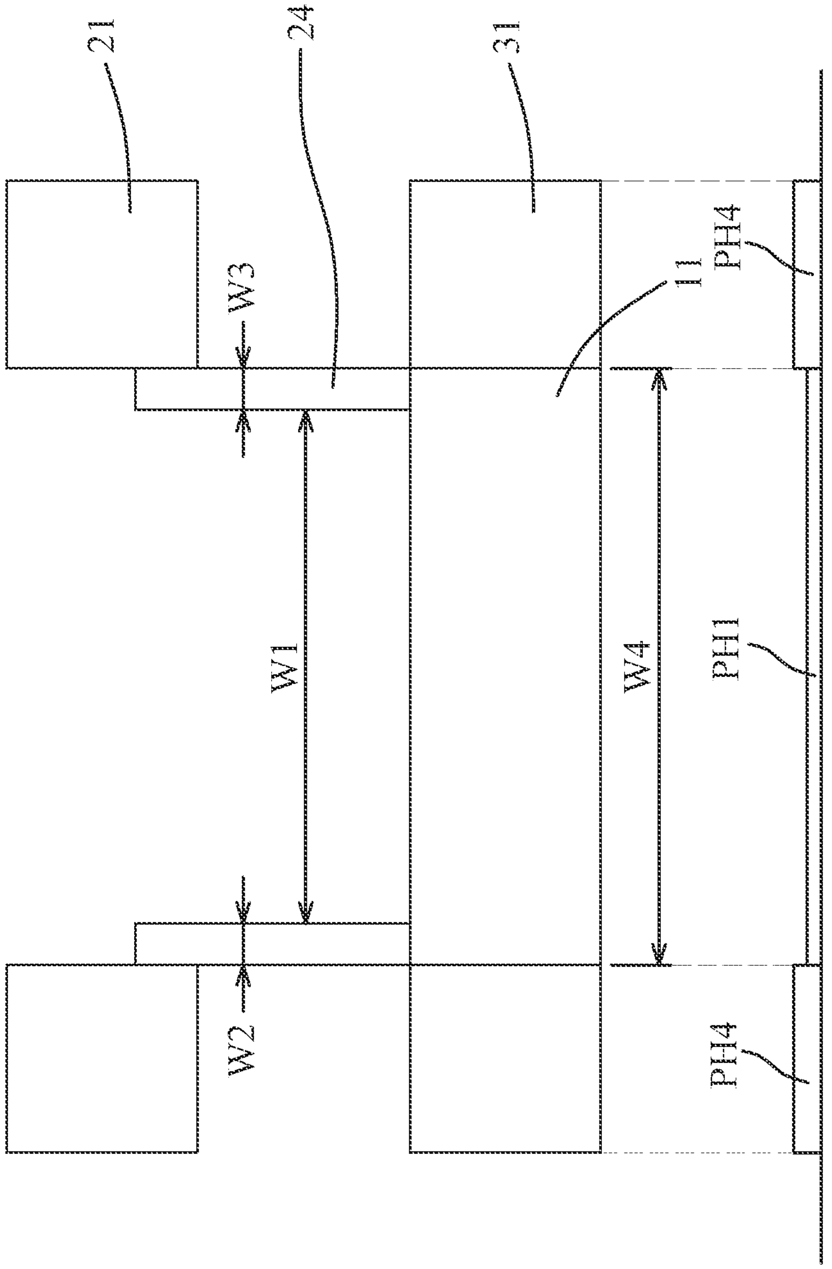
FIG. 5 is a schematic diagram showing a structure of a resistor device according to another embodiment of the present disclosure.

Refer to FIG. 5, and FIG. 5 is a schematic diagram showing a structure of a resistor device according to another embodiment of the present disclosure. The first electrode 21 in FIG. 5 is electrically connected to the resistor layer 11 only through the wire 24 in the vertical direction, and the second electrode 31 is directly electrically connected to the resistor layer 11 without any wire. One end of each wire 24 is connected to a first electrode 21, and the other end of each wire 24 is connected to the resistor layer 11. After the resistor device is powered on, the positions which the wires 23 and the second electrode 31 located on the same side of the resistor layer 11 are connected to the resistor layer 11 have the equipotential.

As mentioned above, to reduce the interference and to stabilize the measured resistance value, the widths W2, W3 of the two wires 24 on the two opposite sides of the resistor layer 11, the distance W1 between the two wires 24 and the length W4 of the resistor layer 11 in the horizontal direction meet the equation as follows, $W4 \leq (W1-W2-W3)$. That is, the summation of the widths W2, W3 of the two wires 24 and the length W4 of the resistor layer 11 in the horizontal direction is less than or equal to the distance W1 between the two wires 24. Thus, the projection line PH1 of the resistor layer 11 in the horizontal direction will not overlap the projection lines PH4 of the first electrodes 21 in the horizontal direction.

Figure 6:
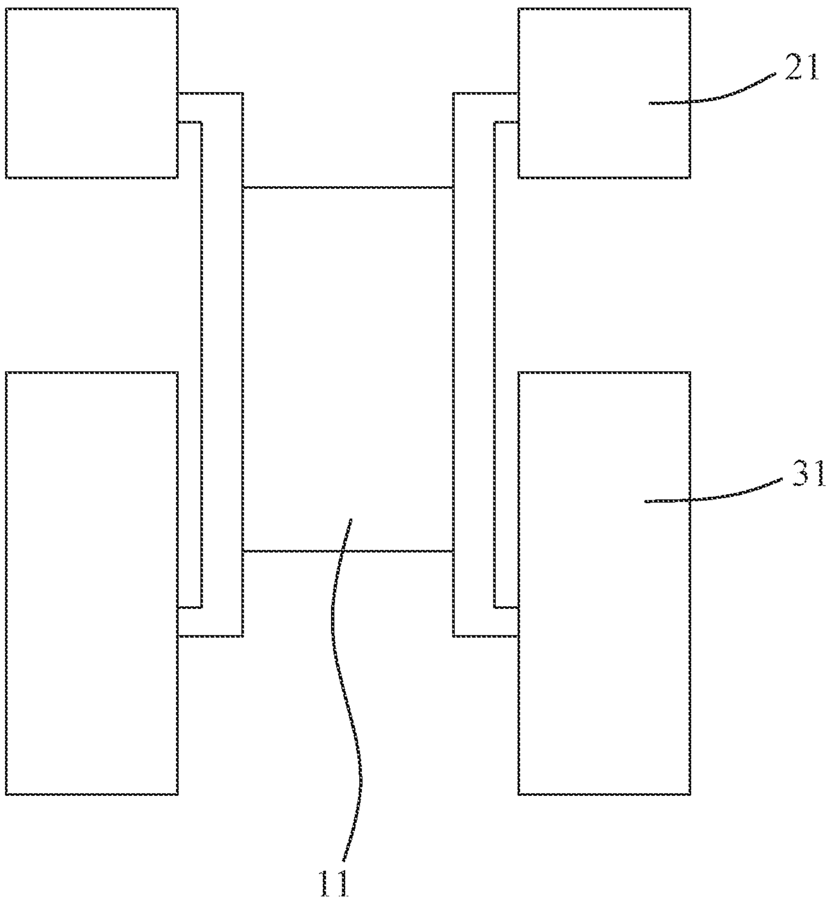
FIG. 6 is a schematic diagram showing a structure of a resistor device according to another embodiment of the present disclosure.

Refer to FIG. 6, and FIG. 6 is a schematic diagram showing a structure of a resistor device according to another embodiment of the present disclosure. The dimensions of the first electrode 21 and the second electrode 31 are different. For example, the widths of the first electrode 21 and the second electrode 31 are the same, but the lengths of the first electrode 21 and the second electrode 31 are different. However, the present invention is not limited by this. It is also possible that the lengths and widths of the first electrode 21 and the second electrode 31 are the same as each other. In order to facilitate the actual packaging, the area that can accommodate the first electrode 21 and the second electrode 31 may have different sizes, so it is necessary to design the first electrode 21 and the second electrode 31 to have different dimensions.

In the above embodiments, specifically, the resistor body 1 further comprises a support layer (not shown), and the support layer is connected to the resistor layer 11, the first electrode assembly 2 and the second electrode assembly 3. In the embodiment, the resistor layer 11, the first electrode assembly 2 and the second electrode assembly 3 are adhered to the support layer, and the resistor body 1, the first electrode assembly 2, and the second electrode assembly 3 are fixed on the support layer, so as to avoid displacement generation between the first electrode assembly 2, the second electrode assembly 3, and the resistor body 1. Thus, it ensures that the resistor device can work successfully, and to further ensures that the accuracy of the measurement results of the resistor device can be high.

Besides, the first wire 22, the second wire 32, the wires 23, 24 and 33 can be selectively coated with copper or not coated with copper. Although copper coating can reduce the resistivity of the first wire 22, the second wire 32 and the wires 23, 24 and 33, and the resistance stability of the measurement is better, the solder mask is coated after the copper coating, which causes that the first electrode 21 and the second electrode 31 corresponding to the first wire 22, the second wire 32 and the wires 23, 24 and 33 will have a position difference. After the resistor device is mounted on the board, because the first wire 22, the second wire 32 and the wires 23, the 24 and the 33 are relatively high, the welding area of the first electrode 21 and the second electrode 31 will be suspended, resulting in the failure of the resistor device. Preferably, the first wire 22, the second wire 32 and the wires 23, 24 and 33 are not coated with the copper.

Figure 7:
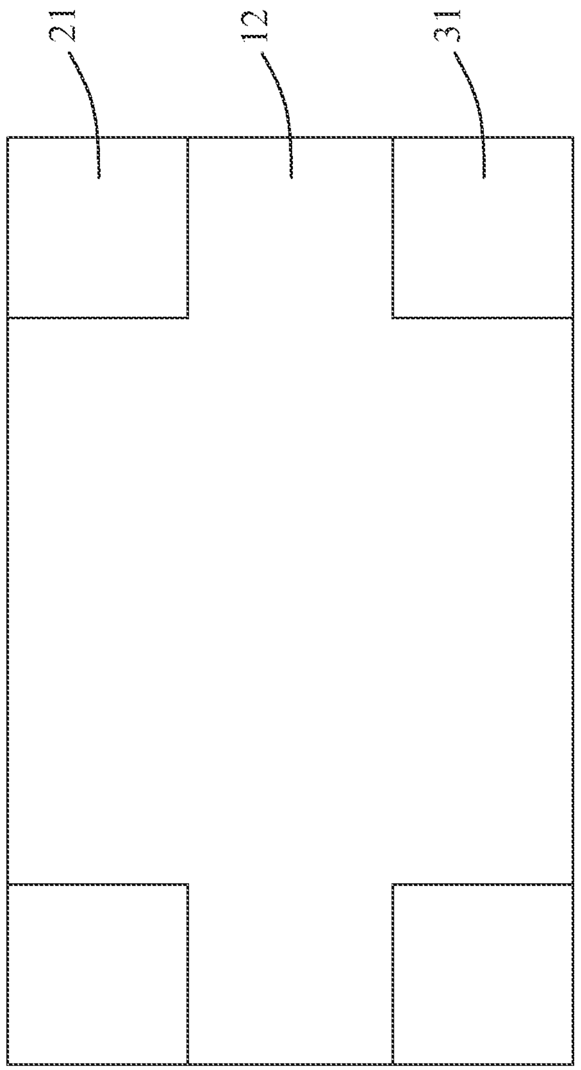
FIG. 7 is a schematic diagram showing a package structure of a resistor device according to an embodiment of the present disclosure.
Figure 8:
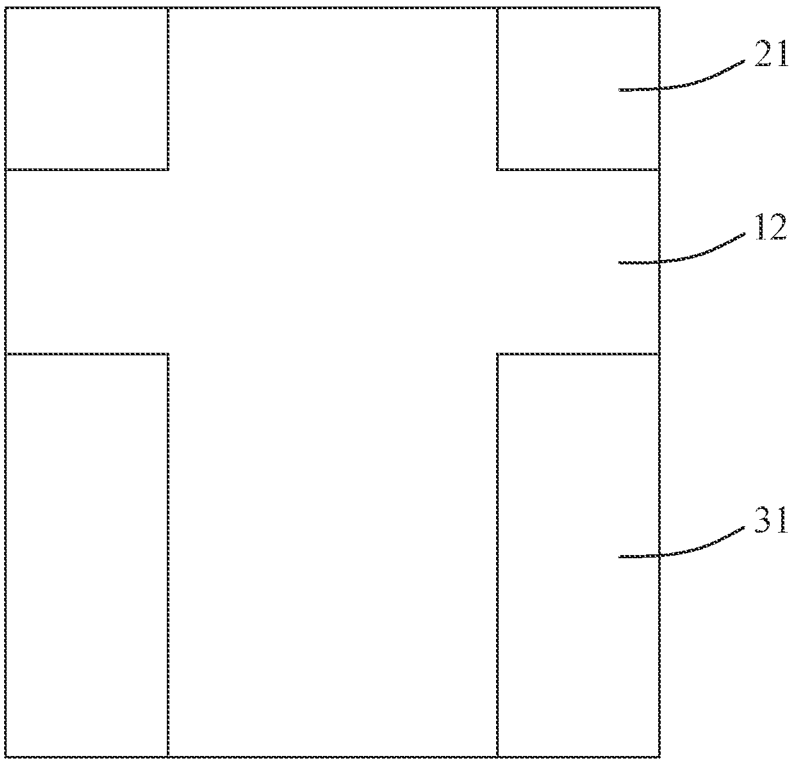
FIG. 8 is a schematic diagram showing a package structure of a resistor device according to another embodiment of the present disclosure.

Refer to FIG. 7 and FIG. 8, FIG. 7 is a schematic diagram showing a package structure of a resistor device according to an embodiment of the present disclosure, and FIG. 8 is a schematic diagram showing a package structure of a resistor device according to another embodiment of the present disclosure. In order to make the patch quality of the resistor device high, the resistor body 1 further comprises a solder mask 12, the solder mask 12 is coated on the side of the resistor layer 11 away from the support layer, and the solder mask 12 is also coated between the two oppositely arranged first electrodes 21, between the two oppositely arranged second electrodes 31, and between the adjacent first electrode 21 and the second electrode 31. The solder mask 12 can effectively avoid shorting between the resistor layer 11, the first electrode 21 and the second electrode 31.

Figure 9:
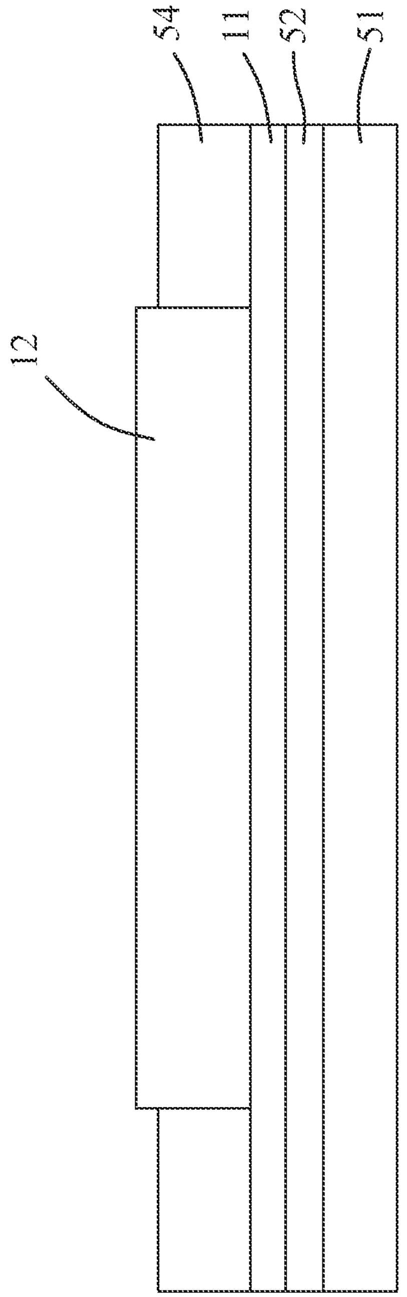
FIG. 9 is a schematic diagram showing a cross section of a package structure of a resistor device according to an embodiment of the present disclosure.

Refer to FIG. 9, and FIG. 9 is a schematic diagram showing a cross section of a package structure of a resistor device according to an embodiment of the present disclosure. In the embodiment of FIG. 9, the resistor device is composed of a support layer 51, an adhesive layer 52, the resistor layer 11, an electrode layer 54 and the solder mask 12. The adhesive layer 52 is located on the support layer 51, and is used for bonding the resistor layer 11 to the support layer 51. The resistor layer 11 is located on the adhesive layer 52, the electrode layer 54 and the solder mask 12 are formed on the resistor layer 11, and the solder mask 12 is located between the first electrode 21 and the second electrode 31 of the electrode layer 54. The solder mask 12 is also located between the two first electrodes 21 of the electrode layer 54, and the solder mask 12 is further located between the two second electrodes 32 of the electrode layer 54.

Figure 10:
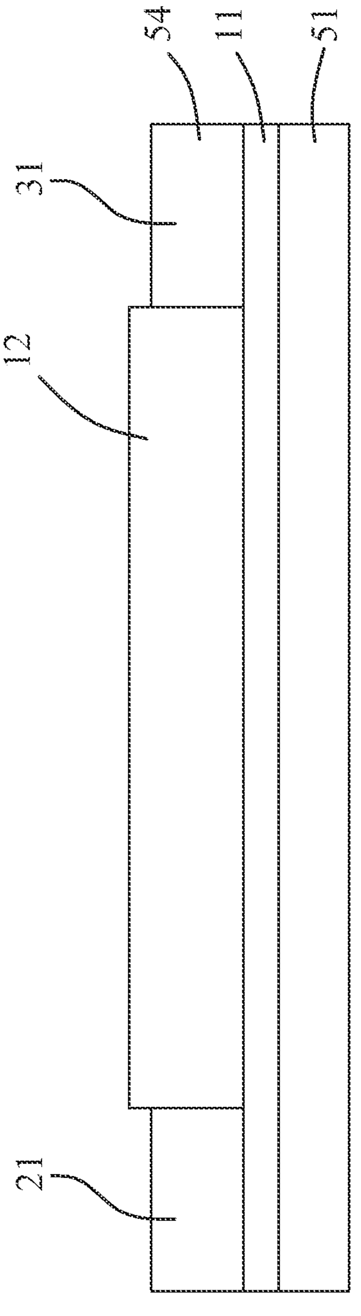
FIG. 10 is a schematic diagram showing a cross section of a package structure of a resistor device according to another embodiment of the present disclosure.

Refer to FIG. 10, and FIG. 10 is a schematic diagram showing a cross section of a package structure of a resistor device according to another embodiment of the present disclosure. Different from the embodiment of FIG. 9, the resistor device is composed of a support layer 51, a resistor layer 11, an electrode layer 54 and a solder mask 12. That is, the resistor device in the embodiment does not have the adhesive layer 52 of FIG. 9, and the resistor layer 11 is directly formed on the support layer 51.

Figure 11:
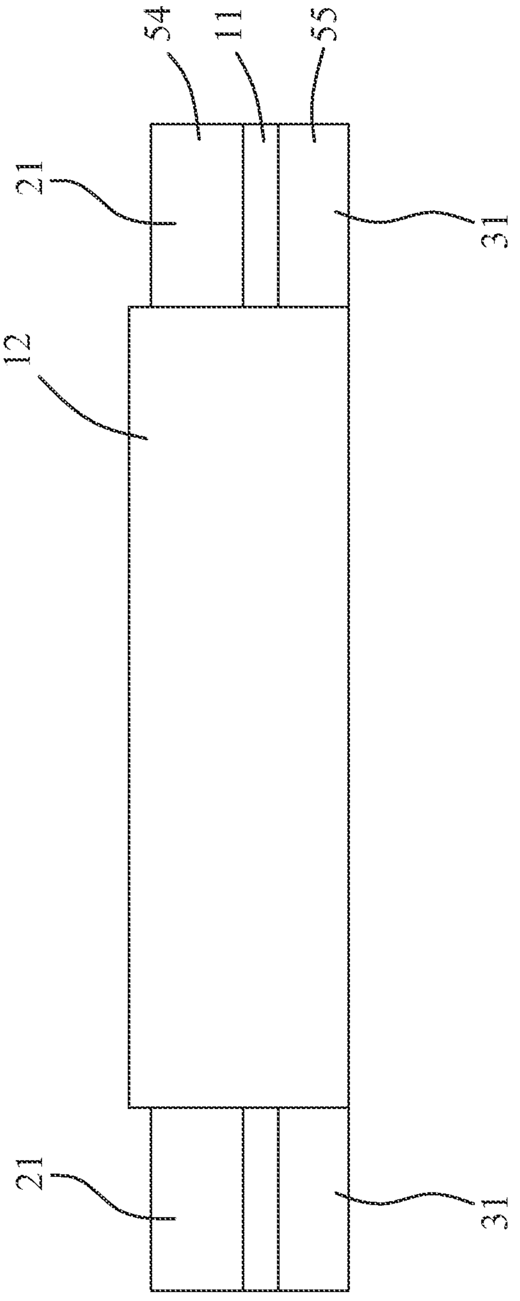
FIG. 11 is a schematic diagram showing a cross section of a package structure of a resistor device according to another embodiment of the present disclosure.

Refer to FIG. 11, and FIG. 11 is a schematic diagram showing a cross section of a package structure of a resistor device according to another embodiment of the present disclosure. Different from the previous two embodiments, the resistor device is composed of a resistor layer 11 electrode layers 54 and 55 and a solder mask 12, wherein the electrode layers 54 and 55 are located above and below the resistor layer 11, respectively. In this embodiment, the first electrodes 21 can be formed by the electrode layer 54, and the second electrodes 31 can be formed by the electrode layer 55, that is, a four-electrodes structure is formed through two electrode layers 54 and 55, instead of only one electrode layer 54 in the previous embodiment. The structure is particularly suitable for vertical electrical connection applications, such as advanced three-dimensional packaging technology.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

The invention claimed is:

1. A resistor device, comprising:

a resistor body, comprising a resistor layer;

a first electrode assembly, comprising two first electrodes symmetrically distributed on both sides of the resistor layer, wherein the two first electrodes are electrically connected to the resistor layer; and a second electrode assembly, comprising two second electrodes symmetrically distributed on the both sides of the resistor layer, wherein the second electrodes are electrically connected to the resistor layer, an electric potential of a position where one of the first electrodes is located on a first side of the both sides of the resistor layer and connected to the resistor layer is identical to an electric potential of a position where one of the second electrodes is located on the first side of the both sides of the resistor layer and connected to the resistor layer, and an electric potential of a position where other one of the first electrodes is located on a second side of the both sides of the resistor layer and connected to the resistor layer is identical to an electric potential of a position where other one of the second electrodes is located on the second side of the both sides of the resistor layer and connected to the resistor layer.

2. The resistor device of claim 1, wherein the first electrode assembly further comprises first wires, an end of each of the first wires is connected to the corresponding one of the first electrodes, and another end of each of the first wires is connected to the resistor layer; the second electrode assembly further comprises two second wires, an end of each of the second wires is connected to the corresponding one of the second electrodes, another end of each of the second wires is connected to the resistor layer, an electric potential of a position where one of the first wires is located on the first side of the both sides of the resistor layer and connected to the resistor layer is identical to an electric potential of a position where one of the second wires is located on the first side of the both sides of the resistor layer and connected to the resistor layer, and an electric potential of a position where other one of the first wires is located on the second side of the both sides of the resistor layer and connected to the resistor layer is identical to an electric potential of a position where other one of the second wires is located on the second side of the both sides of the resistor layer and connected to the resistor layer.

3. The resistor device of claim 2, wherein each of the first wires comprises a first straight wire and a second straight wire which is vertical and connected to the first straight wire, an end of the first straight wire of each of the first wires away from the corresponding second straight wire is connected to the corresponding one of the first electrodes, an end of the second straight wire of each of the first wires away from the corresponding first straight wire is connected to the resistor layer, an electric potential of a position where the second straight wire of one of the first wires is located on the first side of the both sides of the resistor layer and connected to the resistor layer is identical to an electric potential of a position where one of the second wires is located on the first side of the both sides of the resistor layer and connected to the resistor layer, and an electric potential of a position where the second straight wire of other one of the first wires is located on the second side of the both sides of the resistor layer and connected to the resistor layer is identical to an electric potential of a position where other one of the second wires is located on the second side of the both sides of the resistor layer and connected to the resistor layer.

4. The resistor device of claim 3, wherein a width of each of the first wires is less than a width of a connection terminal of each of the first electrodes, and a distance X4 between the both sides of the resistor layer, a distance X2 between two ends of one of the two first straight wires of the first wires, a distance X3 between two ends of the other one of the two first straight wires of the first wires and a distance X1 between the two first electrodes meet an equation as follows, $X4 \leq (X1 - X2 - X3)$.

5. The resistor device of claim 3, wherein each of the second wires comprises a third straight wire and a fourth straight wire which is vertical and connected to the third straight wire, an end of the third straight wire of each of the second wires away from the corresponding fourth straight wire is connected to the corresponding one of the second electrodes, an end of the fourth straight wire of each of the second wires away from the corresponding third straight wire is connected to the resistor layer, an electric potential of a position where the second straight wire of one of the first wires is located on the first side of the both sides of the resistor layer and connected to the resistor layer is identical to an electric potential of a position where the fourth straight wire of one of the second wires is located on the first side of the both sides of the resistor layer and connected to the resistor layer, and an electric potential of a position where the second straight wire of other one of the first wires is located on the second side of the both sides of the resistor layer and connected to the resistor layer is identical to an electric potential of a position where the fourth straight wire of other one of the second wires is located on the second side of the both sides of the resistor layer and connected to the resistor layer.

6. The resistor device of claim 5, wherein a width of each of the second wires is less than a width of a connection terminal of each of the second electrodes, and a distance X4 between the both sides of the resistor layer, a distance X'2 between two ends of one of two third straight wires of the second wires, a distance X'3 between two ends of the other one of the two third straight wires of the second wires and a distance X'1 between the two second electrodes meet an equation as follows, X4≤(X'1−X'2−X'3).

7. The resistor device of claim 5, further comprising two fifth straight wires, wherein the second straight wire of one of the first wires and the fourth straight wire of the corresponding one of the second wires are collinear and connected to one of the fifth straight wires, a side of each of the fifth straight wires is connected to the resistor layer.

8. The resistor device of claim 7, wherein a width of each of the first wires is less than a width of a width of a connection terminal of each of the first electrodes, and a width of each of the second wires is less than a width of a connection terminal of each of the second electrodes.

9. The resistor device of claim 8, wherein a width of each of the fifth straight wires is less than or equal to a distance which the corresponding of the first electrodes and the resistor layer are projecting to a first direction, and a width of each of the fifth straight wires is less than or equal to a distance which the corresponding one of the second electrodes and the resistor layer are projecting to a first direction, wherein the first direction is a direction from one of the both sides of the resistor layer to the other one of the both sides of the resistor layer.

10. The resistor device of claim 1, wherein the first electrode assembly further comprises wires parallel to the first direction, an end of the wire is connected to the corresponding one first electrode, and another end of the wire is connected to the resistor layer, wherein the first direction is a direction from the side of the resistor layer to the other one side of the resistor layer; the second electrode is directly connected to the resistor layer, and positions which the wire and the second electrode located the same side of the resistor layer are connected to the resistor layer have an equipotential.

11. The resistor device of claim 10, wherein a width Y2 of the wire, a width Y3 of the second electrode, a distance Y1 between the second electrode and the wire and a length Y4 which the resistor layer is projecting to a second direction meet an equation as follows, Y4≤(Y1+Y2+Y3), wherein the second direction is vertical to the first direction.

12. The resistor device of claim 1, wherein the first electrode assembly further comprises wires parallel to the first direction, an end of the wire is connected to the first electrode, and another end of the wire is connected to the resistor layer, wherein the first direction is a direction from the side of the resistor layer to the other one side of the resistor layer; the second electrode assembly further comprises another two wires parallel to the first direction, an end of the other one wire is connected the second electrode, another end of the other one wire is connected to the resistor layer, and positions which the wire and the other one wire located the same side of the resistor layer are connected to the resistor layer have an equipotential.

13. The resistor device of claim 12, wherein a width Z2 of the wire, a width Z3 of the other one wire, a distance Z1 between the wire and the other one wire, a width Z3 of the other one wire, a distance Z1 between the wire and the other one wire and a length Z4 which the resistor layer is projecting to a second direction meet an equation as follows, Z4≤(Z1+Z2+Z3), wherein the second direction is vertical to the first direction.

14. The resistor device of claim 1, wherein the first electrode assembly further comprises a wire vertical to the first direction, an end of the wire is connected to the first electrode, another end of the wire is connected to the resistor layer, wherein the first direction is a direction from the side of the resistor layer to the other one side of the resistor layer; the second electrode is directly connected to the resistor layer, and positions which the wire and the second electrode located the same side of the resistor layer are connected to the resistor layer have an equipotential.

15. The resistor device of claim 14, wherein widths W2, W3 which the two wires are projecting to the first direction, a distance W1 between the two sides of the two wires and a length W4 which the resistor layer is projecting to the first direction meet an equation as follows, W4≤(W1−W2−W3).

16. The resistor device of claim 14, wherein a dimension of the first electrode is different from a dimension of the second electrode.

17. The resistor device of claim 1, wherein a dimension of each of the first electrodes is identical to a dimension of each of the second electrodes.

18. The resistor device of claim 1, wherein the resistor device is formed by a support layer, an adhesive layer, the resistor layer, an electrode layer and a solder mask, wherein the adhesive layer is disposed on the support layer and used to adhere the support layer, the resistor layer is disposed on the adhesive layer, and the electrode layer and the solder mask are formed on the resistor layer, wherein the two first electrodes and the two second electrodes are formed by the electrode layer.

19. The resistor device of claim 1, wherein the resistor device is formed by a support layer, the resistor layer, an electrode layer and a solder mask, wherein the resistor layer is disposed on the support layer, the electrode layer and the solder mask are formed on the resistor layer, wherein the two first electrodes and the two second electrodes are formed by the electrode layer.

20. The resistor device of claim 1, wherein the resistor device is formed by the resistor layer, two electrode layers and a solder mask, wherein the two electrode layers are respectively disposed on and under the resistor layer, the two first electrodes are formed by one of the two electrode layers, and the two second electrodes are formed by the other one of the two electrode layers.

* * * * *